July 24, 1923.

Re. 15,660

F. L. GRAY

HAIR CLIPPER

Original Filed April 26, 1920

INVENTOR
F. L. Gray
BY Gray and Lilly
ATTORNEYS

Reissued July 24, 1923. Re. 15,660

UNITED STATES PATENT OFFICE.

FOREST L. GRAY, OF KENMORE, OHIO.

HAIR CLIPPER.

Original No. 1,395,104, dated October 25, 1921, Serial No. 376,740, filed April 26, 1920. Application for reissue filed April 28, 1923. Serial No. 635,346.

*To all whom it may concern:*

Be it known that I, FOREST L. GRAY, a citizen of the United States, residing at Kenmore, in the county of Summit and State of Ohio, have invented certain new and useful Improvements in Hair Clippers, of which the following is a full, clear, and exact specification.

This invention relates to improvements in clippers especially designed for barbers' use, though they may obviously be used for clipping other hair, wool or fur, and has for an object the provision of means whereby the length of the hair or other strands being cut may be regulated.

Another object is the provision of means for preventing the clippers from sticking to the body, as the neck of a person, due to the moist condition of the skin or the formation of a vacuum beneath the bottom of the clippers.

Another object is the provision of blades adapted to be attached to the lower surface of the clipper and extending from a line flush with the forward ends of the clipper blades backward to the rear edge of the clipper body plates, and designed to space the clipper teeth from the body as may be desired.

A further object of my invention is to provide such device which shall include clipper blades before mentioned and which may either be manufactured with the clipper or be made separately and attached thereto removably.

With these and other objects and advantages in view the invention consists of certain improvements in construction and arrangement now to be described in detail, and pointed out in the appended claims, and illustrated in the accompanying drawings in which—

Figure 1:
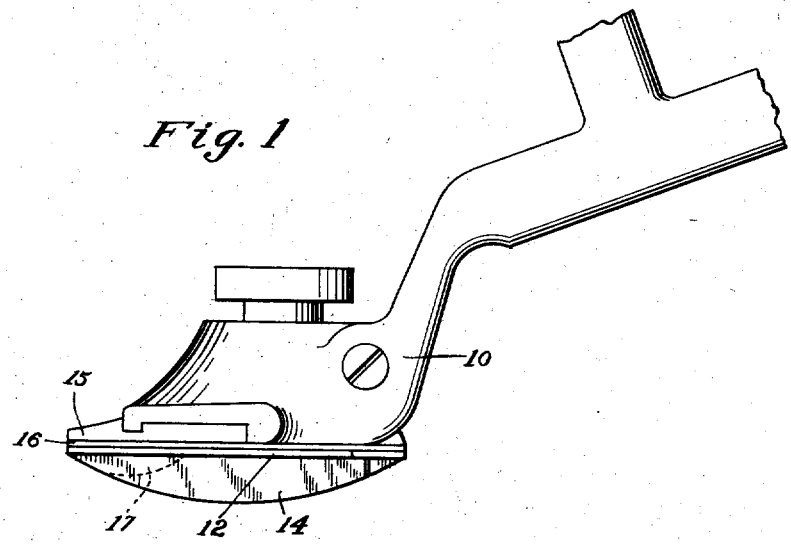
Figure 1 is a side elevation of a pair of clippers embodying my invention.

Referring to the drawings more in detail, and wherein like characters of reference denote corresponding parts throughout the several views, the clipper which is designated in its entirety by the reference character 10 includes movable and stationary clipping members 15 and 16, the latter being serrated at its forward edge, and the movable bar usually serrated, though this is not essential, the exact construction of the clipping members not being the feature at issue in this application. This stationary plate 16 carrying the so-called comb teeth has attached thereto from the bottom thereof in right angled relation, a plurality of spaced blades 14 the outer edges of which are convex in shape and which provide runners upon which the clipper may be rocked to regulate the length of the hair or other substance being cut.

The said blades 14 may be connected directly to the plate 16, if desired, in the manufacture of the device, though it is considered preferable to secure them to a base plate, shown in the drawings as plate 12. This base plate 12 may be detachably secured to plate 16 as by fastening devices 13, so as to permit of its attachment to clippers of various makes. The forward edge of said base plate 12 is serrated as shown at 11 so that said edge may conform to the cutting edge of plate 16. Likewise the forward ends of the blades 14 are arranged flush with the forward edge of base plate 12 and between the said serrations 11, and also flush with the forward edges of the comb teeth on plate 16. The notches between the comb teeth register with the serrations 11.

The forward ends of the blades 14 are pointed and the rear ends extend rearwardly to the rear edge of the plate 12. By the said arrangement it will be seen that the said blades extend the full length of the plates 12 and 16, and from the forward ends of the comb teeth back to the rear edge of said plates. This permits gaging the length of the cut of the clipper whether the latter is rocked well forward near the ends of the clipping teeth or backwardly toward the rear edge of the plate 12.

Figure 2:
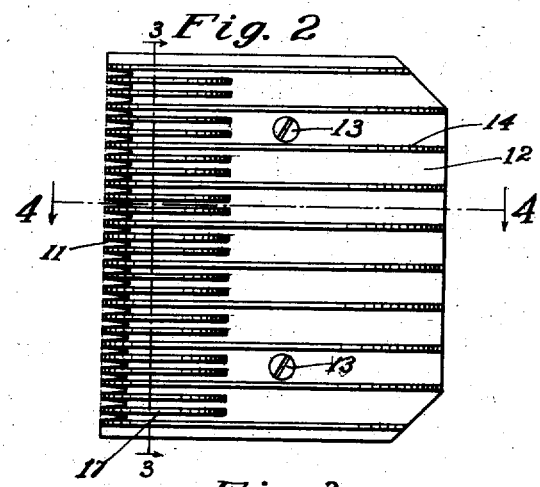
Figure 2 is a bottom plan of the base plate.
Figure 3:
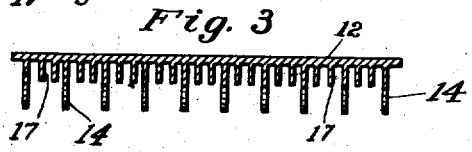
Figure 3 is a transverse sectional view of the base plate taken on the line 3—3 of Fig. 2.
Figure 4:
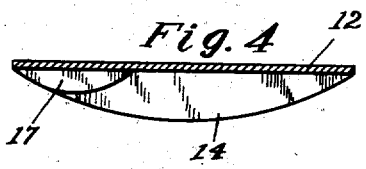
Figure 4 is a sectional view of the base plate and attached parts taken on the line 4—4 of Fig. 2.

Extending from the bottom of the base plate 12 are spaced pairs of teeth or blades 17 shorter than the blades 14 and preferably positioned between pairs of blades 14, usually two shorter blades are positioned between blades 14 throughout the surface of the base plate, as shown in Figs. 2 and 3. These shorter blades 17 are also convex on the lower edges, and their forward ends are flush with the ends of the longer blades and also of the said comb teeth. These blades 14 and 17 provide for the separation of the hair and prevent the formation of a vacuum beneath the bottom of the base plate 12.

In operation of the device, the attachment as shown in Fig. 1 as applied to the clipper, serves to regulate the length of hair being cut and to vary such length by rocking the clipper as may be desired, the convex form of the edges of the blades on the base plate enabling the operator to apply the cutting teeth of the clipper close to the skin or gradually raising the cutter teeth therefrom as the tool is rocked backward; but in any position the blades serve to protect the skin from the action of the cutter teeth, since the blades extend forward to actual alinement with the points of the comb teeth and the serrations of the base plate.

While this specification sets forth in detail the present and preferred construction of the device, still such deviations from such detail may be resorted to as do not form a departure from the spirit of the invention, as defined by the appended claims.

Having described my invention what I claim as new and useful and desire to secure by Letters Patent, is:

1. The combination with a hair clipping device, of a base plate, a plurality of right angularly disposed spaced blades carried thereby, said blades having convex outer edges terminating in pointed ends, and extending from the extreme ends of the teeth of the clipping device to the rear edge of the base plate.

2. The combination with a hair clipping device of a base plate, teeth located along the forward edge of said plate, a plurality of right angularly disposed spaced blades carried thereby, said blades having convex outer edges terminating forwardly in pointed ends which register with the teeth of the plate, and extending from the points of said teeth rearwardly to the rear edge of said base plate.

3. The combination with a hair clipping device including movable and stationary cutting members, the forward edge of the latter member being serrated to provide comb teeth, of a base plate detachably secured to said stationary member, a plurality of spaced blades disposed at right angles to the base plate and secured thereto, said blades having convex outer edges and extending from the points of the said comb teeth to the rear edge of the base plate.

4. The combination with a hair clipping device of a base plate, a plurality of right angularly disposed spaced blades carried thereby, said blades having convex outer edges terminating in forwardly pointed ends which extend from the points of the teeth of the clipping device to the rear edge of the base plate, and spaced pairs of relatively short curved blades located between the first mentioned blades.

5. The combination with a hair clipping device including movable and stationary cutting members, the forward edge of the latter member being serrated to provide comb teeth, of a base plate detachably secured to said stationary member and having a serrated edge whose teeth register with the said comb teeth, a plurality of spaced blades secured to the base plate at right angles thereto, said blades having convex outer edges and extending from the points of said teeth to the rear edge of the base plate.

6. An attachment for hair clippers comprising a base plate having a forward serrated edge and a plurality of spaced blades secured to said plate at right angles thereto, the said blades having pointed ends and their outer edges being convex, certain of said blades extending rearwardly to the rear edge of the base plate, and others shorter and positioned between the longer blades, and means for detachably securing said plate to the stationary cutter member of a clipping device with the forward ends of all the blades registering with the serrations in said plate edge and the teeth of said clipping device.

7. An attachment for hair clippers comprising a base plate having a forward serrated edge and a plurality of spaced blades secured to said plate at right angles thereto, the said blades having pointed ends and their outer edges being convex, and means for detachably securing said plate to the stationary cutter member of a clipping device with the forward blade ends registering with the teeth of said clipping device and their points flush therewith.

8. An attachment for hair clippers comprising a base plate having a forward serrated edge, a plurality of spaced blades secured to said plate at right angles thereto, said blades having pointed ends and their outer edges being convex and extending back to the rear edge of the plate, and means for detachably securing said plate to the stationary cutter member of a clipping device with said blade ends flush with the points of the teeth of said clipping device and registering therewith.

In testimony whereof I hereunto affix my signature.

FOREST L. GRAY.